(12) United States Patent
Tornow et al.

(10) Patent No.: US 10,988,031 B2
(45) Date of Patent: Apr. 27, 2021

(54) METHOD AND DEVICE FOR ADJUSTING A TORQUE OF A DRIVEN WHEEL OF A MOTOR VEHICLE

(71) Applicant: Robert Bosch GmbH, Stuttgart (DE)

(72) Inventors: Henrik Tornow, Vaihingen/Enz (DE); Marcel Maur, Asperg (DE); Thomas Kopp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 14/978,133

(22) Filed: Dec. 22, 2015

(65) Prior Publication Data
US 2016/0200218 A1    Jul. 14, 2016

(30) Foreign Application Priority Data

Jan. 8, 2015 (DE) ..................... 10 2015 200 122.9

(51) Int. Cl.

| | |
|---|---|
| *B60L 9/00* | (2019.01) |
| *G05D 1/00* | (2006.01) |
| *G06F 17/00* | (2019.01) |
| *G06F 7/00* | (2006.01) |
| *B60L 15/20* | (2006.01) |
| *B60L 7/26* | (2006.01) |
| *B60L 3/00* | (2019.01) |
| *B60L 3/12* | (2006.01) |

(52) U.S. Cl.
CPC ............ *B60L 15/20* (2013.01); *B60L 3/0061* (2013.01); *B60L 3/12* (2013.01); *B60L 7/26* (2013.01); *B60L 15/2009* (2013.01); *B60L 2240/423* (2013.01); *Y02T 10/64* (2013.01); *Y02T 10/72* (2013.01)

(58) Field of Classification Search
CPC ........ B60L 15/20; B60L 3/12; B60L 15/2009; B60L 7/26; B60L 3/0061; B60L 2240/423; Y02T 10/64; Y02T 10/72
USPC .......................................................... 701/22
See application file for complete search history.

(56) References Cited

U.S. PATENT DOCUMENTS 3,753,064 A * 8/1973 Agarwal ........................ 318/803
3,866,703 A * 2/1975 Eastham ................. B60L 53/20
180/65.1

(Continued)

FOREIGN PATENT DOCUMENTS

| DE | 102014210921 A1 | 12/2014 |
|---|---|---|
| DE | 102013219748 A1 | 4/2015 |

OTHER PUBLICATIONS

IP.com Search—Feb. 1, 2021 (Year: 2021).*

*Primary Examiner* — Mahmoud S Ismail
(74) *Attorney, Agent, or Firm* — Michael Best & Friedrich LLP

(57) ABSTRACT

The invention relates to a method for operating a motor vehicle (1) which has at least one electric machine (7) which can be/is operatively connected to at least one driven wheel (6) of the motor vehicle (1), and a safety device (13) which is assigned to a driven wheel (6), is independent of the electric machine (7) and when necessary applies a positive or negative torque to the driven wheel (6), wherein the electric machine (7) is operated by an inverter (8). There is provision that the inverter (8) is monitored for incorrectly set torques, and that the safety device (13) is actuated as a function of a detected incorrect torque.

9 Claims, 1 Drawing Sheet

(56) References Cited

U.S. PATENT DOCUMENTS

| | | | | |
|---|---|---|---|---|
| 5,289,093 A * | 2/1994 | Jobard | | B60L 3/10 318/434 |
| 5,940,286 A * | 8/1999 | Harmoinen | | H02P 21/30 318/432 |
| 6,209,692 B1 * | 4/2001 | Pels | | F16F 15/1201 188/381 |
| 6,278,916 B1 * | 8/2001 | Crombez | | B60L 7/26 180/197 |
| 7,317,978 B2 * | 1/2008 | Ashizawa | | B60K 6/48 701/51 |
| 7,778,747 B2 * | 8/2010 | Hawkins | | B60L 3/102 701/22 |
| 8,165,743 B2 * | 4/2012 | Oyama | | B60L 3/003 180/65.21 |
| 8,909,406 B2 * | 12/2014 | Ozaki | | B60T 7/12 701/22 |
| 8,988,016 B2 * | 3/2015 | Daigle | | B60L 3/104 318/52 |
| 9,555,721 B2 * | 1/2017 | Zhang | | B60L 3/102 |
| 10,093,307 B2 * | 10/2018 | Hayakawa | | B60W 50/029 |
| 10,286,892 B1 * | 5/2019 | Johri | | B60K 6/48 |
| 2002/0053891 A1 * | 5/2002 | Lee | | H02P 27/08 318/432 |
| 2003/0102833 A1 * | 6/2003 | Murakami | | H02P 6/24 318/362 |
| 2004/0038775 A1 * | 2/2004 | Shimizu | | B60K 6/44 477/6 |
| 2004/0040375 A1 * | 3/2004 | Kadota | | B60K 6/00 73/115.02 |
| 2004/0182626 A1 * | 9/2004 | Katou | | B62D 6/10 180/226 |
| 2008/0183361 A1 | 7/2008 | Oyama | | |
| 2011/0266985 A1 * | 11/2011 | Eisenhardt | | B60L 3/0038 318/400.21 |
| 2011/0307129 A1 * | 12/2011 | Yu | | B60L 15/2036 701/22 |
| 2012/0118652 A1 * | 5/2012 | Yamamoto | | B60K 17/046 180/65.6 |
| 2012/0330484 A1 * | 12/2012 | Martin | | B60L 7/18 701/22 |
| 2013/0187453 A1 * | 7/2013 | Flett | | H05K 7/20509 307/23 |
| 2013/0293163 A1 * | 11/2013 | Flett | | H02P 7/06 318/139 |
| 2013/0296132 A1 * | 11/2013 | Doering | | B60W 10/08 477/86 |
| 2013/0325239 A1 * | 12/2013 | Ozaki | | B60T 7/12 701/22 |
| 2014/0001987 A1 * | 1/2014 | Okada | | B60L 7/16 318/370 |
| 2014/0159628 A1 * | 6/2014 | Brooking | | H02P 29/032 318/400.22 |
| 2014/0246999 A1 * | 9/2014 | Kezobo | | B62D 5/0484 318/400.23 |
| 2016/0020719 A1 * | 1/2016 | Tang | | H02P 27/06 318/798 |
| 2016/0200324 A1 * | 7/2016 | Suzuki | | B60L 3/12 701/22 |
| 2017/0110999 A1 * | 4/2017 | Shimada | | H02P 23/03 |
| 2017/0201204 A1 * | 7/2017 | Kawano | | H02P 29/032 |

* cited by examiner

METHOD AND DEVICE FOR ADJUSTING A TORQUE OF A DRIVEN WHEEL OF A MOTOR VEHICLE

BACKGROUND OF THE INVENTION

The invention relates to a method for operating a motor vehicle which has at least one electric machine which can be/is operatively connected to at least one driven wheel of the motor vehicle, and a safety device which is assigned to a driven wheel, is independent of the electric machine and can be actuated, wherein the safety device when necessary applies a positive or negative torque to the driven wheel, and wherein the electric machine is operated by an inverter.

In addition, the invention relates to a device for operating such a motor vehicle and to a corresponding motor vehicle.

Contemporary motor vehicles frequently have, as a single or additional drive machine, an electric machine which is or can be operatively connected directly or via a transmission to at least one driven wheel, in particular to a drive axle for a motor vehicle. If a fault occurs in the electric drive train, this frequently brings about a changed torque of the electric machine, which torque has an effect on the drive torque of the driven wheel. This undesired positive or negative torque can produce a wheel slip at the driven wheels, which wheel slip can have a negative effect on the controllability of the motor vehicle. If the motor vehicle also has a safety braking system, in particular an ESP (electronic stability program) system, said system detects a slip of the wheels and when possible reduces the wheel slip again by means of a braking intervention.

SUMMARY OF THE INVENTION

The method according to the invention has the advantage that an undesired torque of the electric machine is already reduced early, in particular before said torque can at all bring about a wheel slip at the driven wheel. For this purpose there is provision according to the invention that the inverter of the electric machine is monitored for incorrectly set torques of the electric machine, and that the safety device is actuated as a function of an incorrect torque. According to the invention, it is therefore not the wheel but instead the inverter of the electric drive train which is monitored for incorrect torques. The inverter, which is usually actuated by means of pulse-width modulation, can easily be monitored for the occurrence of incorrect torques in that, for example, the control times of the switching elements of the inverter are monitored and compared with setpoint control times. As a result, the cause of an incorrect torque is already detected. As a result of the fact that the safety device is actuated as a function of the detected cause, said device can react or be actuated very much earlier than previously, in order to compensate for the undesired torque at the driven wheel. In particular, as a result it is possible to prevent the occurrence of an undesired torque at the driven wheel from the start and as a result to ensure the driving stability of the motor vehicle to an optimum degree.

According to one advantageous development of the invention there is provision that the safety device is actuated to compensate for the incorrect torque. If it is determined during the monitoring of the inverter that an undesired positive drive torque is produced, the safety device is actuated to produce a correspondingly negative torque and to apply said torque to the driven wheel, in order to compensate for the positive torque coming from the electric machine. Correspondingly, if it is detected during the monitoring of the inverter that an undesirably low torque of the electric machine is set, said torque is then compensated for by the actuation of the safety device in such a way that said safety device applies a positive torque to the driven wheel.

According to one advantageous development of the invention there is provision that a brake device which is assigned to the driven wheel is activated as a safety device. In particular there is provision that a safety braking system of the motor vehicle, in particular an ESP system, is used as the safety device. As a result of the production of a braking torque at the driven wheel or wheels, a negative torque or braking torque is built up in a short time directly at the respective driven wheel and counteracts an undesirably high drive torque of the electric machine, with the result that, in particular, spinning of the driven wheel is reliably avoided.

Furthermore there is preferably provision that the brake device is actuated with a delay with respect to the detection of an incorrect torque. In this context, it is taken into account that if the fault was detected in the inverter, a certain amount of time passes before this fault has an effect on the torque which is actually output by the electric machine at the driven wheel. As a result of delayed actuation of the brake device it is ensured that a premature braking intervention does not take place.

In particular there is provision that the delay is determined as a function of inertia of the electric drive train of the electric machine up to the driven wheel. In this context, in particular inertias and elasticities of the mechanical drive train as well as the reaction time which passes between the actuation by the inverter and the drive torque which actually takes place is taken into account.

Furthermore there is preferably provision that additionally or alternatively a drive machine which can be operated independently of the electric machine is actuated as a safety device, in order to generate a positive torque. An incorrectly set negative torque can be counteracted or compensated by this positive torque. An internal combustion engine and/or a further electric machine of the motor vehicle are/is preferably actuated as a further drive machine. In particular there is provision that a torque of an internal combustion engine is increased in a short time by means of adjustment of the ignition angle. It is also conceivable to set the torque of the internal combustion engine by means of an increased air charge insofar as the air dynamics of the internal combustion engine are sufficiently fast, with the result that the internal combustion engine then makes available an increased torque if the undesired torque of the electric machine occurs at the driven wheels. Corresponding delay times are also expediently taken into account here, with the result that the compensating torque is then applied to the driven wheel or wheels even if the incorrect torque reaches the driven wheel or wheels.

The device according to the invention is defined by a control device which carries out the method according to the invention in the case of correct usage. As a result, the advantages already mentioned are obtained. Further features and advantages are apparent from what has been described above as well as from the claims.

The motor vehicle according to the invention is defined by the device according to the invention. The advantages which have already been mentioned are obtained here for the motor vehicle. In particular, it is ensured that an undesired wheel slip at a driven wheel is reliably avoided by means of torque compensation of an incorrect or undesired torque. Further advantages and features are apparent from what has been described above as well as from the claims.

BRIEF DESCRIPTION OF THE DRAWINGS

The invention will be explained in more detail below with reference to the drawing, in which.

DETAILED DESCRIPTION

Figure 1:
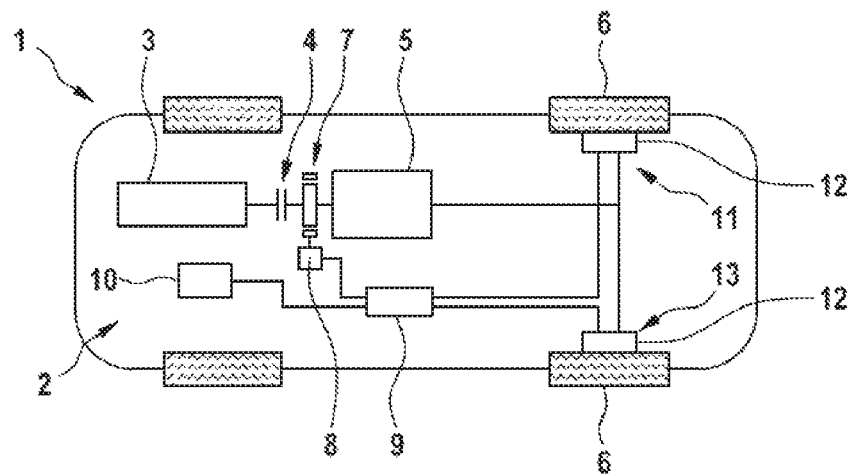
FIG. 1 shows a motor vehicle in simplified plan view.

FIG. 1 shows a simplified plan view of a motor vehicle 1 which has a drive device 2. The drive device 2 has an internal combustion engine 3 which can be operatively connected to a transmission 5 by means of an actuable clutch 4, wherein the transmission 5 is connected on the output side to driven wheel 6 of the motor vehicle. In the present exemplary embodiment, in addition to the internal combustion engine 3 an electric machine 7 is provided as a further drive machine between the clutch 4 and the transmission 5, the rotor of which electric machine 7 is connected in a rotationally fixed fashion to the transmission input shaft of the transmission 5. An inverter 8 which actuates phases of the electric machine 7, in particular in a pulse-width-modulator fashion, is assigned to the electric machine 7. For this purpose, switching elements, in particular semiconductor switches, of the inverter 8 are actuated by means of a control device 9 of the motor vehicle 1. The energy which is necessary to operate the electric machine 7 is extracted here from an electrical accumulator 10, which is embodied, in particular, as a rechargeable battery. In the generator mode of the electric machine 7, the electrical accumulator 10 is charged and it is discharged in the motor mode.

The control device 9, which is integrated into the inverter 8, can be embodied separately therefrom or can be formed together with it by means of a plurality of control devices and operates the inverter 8 in order to set a desired torque of the electric machine 7, and monitors the inverter 8 to determine whether it sets the desired setpoint torque. For this purpose, in particular the switched states of the switching elements and/or the currently present electric currents in the phases of the electric machine 7 are monitored. If the switched states or the currents deviate from the setpoint state, incorrect actuation is detected. In this context, it is determined as a function of the type of incorrect actuation whether the electric machine 7 sets an undesired positive or negative torque or an undesired increased or reduced torque of the electric machine 7.

The control device 9 is also connected to a brake device 11 which has in each case a wheel brake device 12 assigned to each of the driven wheels 6. As a function of the detected torque which has been set by the inverter 8, the control unit 9 actuates the brake device 11 in such a way that an incorrect increased torque of the electric machine 7 is compensated for by the braking intervention of the brake device 11 and a wheel slip at the driven wheels 6 is reliably prevented. In this case, the brake device therefore constitutes a safety device 13.

Figure 2:
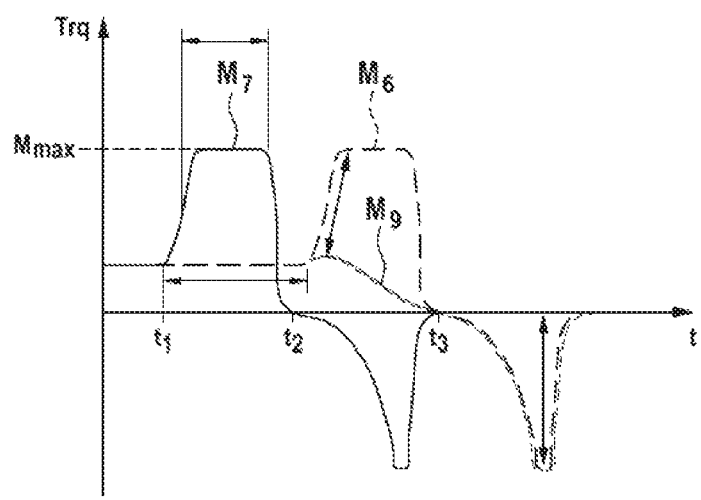
FIG. 2 shows a method for operating the motor vehicle on the basis of a torque/time diagram.

FIG. 2 shows in this respect, plotted against the time t in an exemplary embodiment, a first line $M_7$ which shows the torque profile at the output shaft or rotor shaft of the electric machine 7 in the case of a fault. At a time $t_1$, the case of fault occurs in the inverter 8 and brings about an increase in torque up to a maximum torque $M_{max}$. At a time $t_2$, the actuation of the inverter reacts in order to eliminate the fault by setting a reduced torque up to a time $t_3$.

A second line $M_6$ shows the torque profile of the driven wheels 6. The profile corresponds to the torque profile of the electric machine 7, but has a time delay with respect to the latter, the reason for which delay is the inertia of the drive train of the drive device 2, in particular of the electric machine 7 up to the driven wheels 6.

As a result of the advantageous method which is carried out by the control device 9 as previously described, the torque profiles are smoothed, as is shown by a line $M_9$. The control device 9 takes into account the inertia of the drive train and calculates the time at which the incorrect or undesired torque which is produced by the electric machine 7 at the driven wheels 6 comes into effect. At this time, the control device 9 actuates the brake device 11 in order to bring about the already mentioned braking torque, that is to say negative torque, at the driven wheels 6, which negative torque counteracts the increased drive torque of the electric machine 7, with the result that said drive torque is compensated for or a wheel slip at the driven wheels 6 is avoided.

The control device 9 is also connected to the internal combustion engine 3 in order also to actuate it in the case of a fault, with the result that the internal combustion engine 3 makes available an increased drive torque by means of which the negative torque of the electric machine 7 can be correspondingly compensated for. As a result of the interaction of the negative torque, which is provided by means of the brake device 11, and the positive torque, which is provided by the internal combustion engine 3, the incorrect actuation of the electric machine 7 is completely eliminated or compensated for. This ensures particularly safe and jolt-free operation of the motor vehicle 1.

The communication between the control unit 9, inverter 8 and/or internal combustion engine 3 or a control device which is assigned to the internal combustion engine 3 is carried out, for example, by means of a databus communication or a signal line between the brake device 11 and the inverter 8.

The invention claimed is:

1. A method for operating a motor vehicle including an electric machine configured to be operatively connected to at least one driven wheel of the motor vehicle, and a safety device assigned to a driven wheel, is independent of the electric machine, and is configured to apply a torque to the driven wheel, the method comprising:
    operating the electric machine by an inverter;
    monitoring a plurality of currently present control times of a plurality of switching elements of the inverter;
    comparing each of the plurality of currently present control times being monitored to each of a plurality of setpoint control times;
    determining an incorrectly set torque based on the comparison; and
    actuating the safety device according to a direction or a magnitude of the incorrectly set torque prior to the incorrectly set torque being applied to the driven wheel.

2. The method according to claim 1, wherein the safety device is actuated to compensate for the incorrectly set torque.

3. The method according to claim 1, wherein the safety device is a brake device.

4. The method according to claim 3, wherein the brake device is actuated with a delay with respect to the detection of the incorrectly set torque.

5. The method according to claim 4, wherein the delay is determined as a function of inertia of the drive train of the electric machine up to the driven wheel.

6. The method according to claim 1, wherein the safety device is a drive machine operated independently of the electric machine and wherein actuating the safety device includes generating a positive torque.

7. The method according to claim 6, wherein an internal combustion engine or an additional electric machine is actuated as an additional drive machine.

8. A device for operating a motor vehicle, the device comprising:
   an electric machine configured to be operatively connected to at least one driven wheel of the motor vehicle;
   an inverter configured to operate the electric machine;
   a safety device independent of the electric machine and is configured to apply a torque to the driven wheel; and
   a control device configured to
      monitor a plurality of currently present control times of switching elements of the inverter, compare each of the plurality of currently present control times being monitored to each of a plurality of setpoint control times,
      determine an incorrectly set torque based on the comparison, and actuate the safety device according to a direction or magnitude of the incorrectly set torque prior to the incorrectly set torque being applied to the driven wheel.

9. A motor vehicle comprising a device including an electric machine configured to be operatively connected to at least one driven wheel of the motor vehicle;
   an inverter configured to operate the electric machine;
   a safety device independent of the electric machine and configured to apply a positive torque to the driven wheel; and
   a control device configured to
      monitor a plurality of currently present control times of a plurality of switching elements of the inverter,
      compare each of the plurality of currently present control times being monitored to each of a plurality of setpoint control times,
      determine an incorrectly set torque based on the comparison, and actuate the safety device according to a direction or magnitude of the determined incorrectly set torque prior to the incorrectly set torque being applied to the driven wheel.

* * * * *